United States Patent
Knights

(10) Patent No.: US 9,946,027 B2
(45) Date of Patent: Apr. 17, 2018

(54) DEVICE AND METHOD FOR POST-FABRICATION TRIMMING OF AN OPTICAL RING RESONATOR USING A DOPANT-BASED HEATER

(71) Applicant: RANOVUS INC., Ottawa (CA)

(72) Inventor: Andrew Peter Knights, Dundas (CA)

(73) Assignee: RANOVUS INC., Ottawa, Ontario (CA)

( * ) Notice: Subject to any disclaimer, the term of this patent is extended or adjusted under 35 U.S.C. 154(b) by 31 days.

(21) Appl. No.: 15/066,653

(22) Filed: Mar. 10, 2016

(65) Prior Publication Data
US 2017/0261692 A1    Sep. 14, 2017

(51) Int. Cl.
*G02B 6/293*    (2006.01)
*G02F 1/025*    (2006.01)
*G02F 1/01*    (2006.01)

(52) U.S. Cl.
CPC ..... *G02B 6/29395* (2013.01); *G02B 6/29338* (2013.01); *G02F 1/0121* (2013.01); *G02F 1/025* (2013.01)

(58) Field of Classification Search
None
See application file for complete search history.

(56) References Cited

U.S. PATENT DOCUMENTS

| 5,194,079 A | 3/1993 | Tumminelli et al. |
| 8,519,803 B2 * | 8/2013 | McLaren ............ H01P 1/2084 333/17.1 |
| 2012/0105177 A1 | 5/2012 | McLaren et al. |

OTHER PUBLICATIONS

Extended European Search Report dated Jun. Jul. 21, 2017, by EPO, re European Patent Application No. 17159342. 8 pages.
Schrauwen, J., Van Thourhout, D., & Baets, R. (2008). Trimming of silicon ring resonator by electron beam induced compaction. In 14th European Conference on Integrated Optics (ECIO 08) (pp. 367-370). Eindhoven University of Technology, Cobra Institute.
Atabaki, Amir H., et al., "Accurate Post-Fabrication Trimming of Ultra-Compact Resonators on Silicon", Optics Express, 11048 (2013), published Jun. 6, 2013, OSA, Jun. 17, 2013, vol. 21, No. 12.
Bachman, Daniel, et al., "Permanent Fine Tuning of Silicon Microring Devices by Femtosecond Laser Surface Amorphization and Ablation", Optics Express 11048, published Apr. 29, 2013, OSA, May 6, 2013, vol. 21, No. 9.

* cited by examiner

*Primary Examiner* — Chad H Smith
(74) *Attorney, Agent, or Firm* — Perry + Currier, Inc.

(57) ABSTRACT

A device and method for post-fabrication trimming of an optical ring resonator using a dopant-based heater is provided. An optical ring resonator at the device can be heated using heaters in an optical slab from which the optical ring resonator extends, the heater including a non-uniform doping profile. A controller determines an initial resonance frequency and a target resonance frequency of the optical ring resonator. The controller applies predetermined electrical parameters to the heater using electrical connections to shift a resonance frequency of the optical ring resonator from the initial resonance frequency to the target resonance frequency by causing the dopant in the heater to migrate.

17 Claims, 10 Drawing Sheets

DEVICE AND METHOD FOR POST-FABRICATION TRIMMING OF AN OPTICAL RING RESONATOR USING A DOPANT-BASED HEATER

FIELD

The specification relates generally to telecommunication devices, and specifically to a device and method for post-fabrication trimming of an optical ring resonator using a dopant-based heater.

BACKGROUND

It is generally required that multiple silicon-on-insulator optical ring resonators coupled to the same waveguide and/or optical bus be spaced in resonant frequency at a specific step-size (e.g. 50 GHz, 200 GHz, etc.). The variance in fabrication of multiple silicon-on-insulator optical ring resonators (e.g. etch-depth, width etc.) is such that it is usually not possible to space the resonances with sufficient accuracy or precision. Thus, thermal tuning of each individual optical ring resonator is used such that the specific spacing is achieved during operation. This adds complexity to the control circuit performing the thermal tuning, and requires additional power dissipation for the device. Physical post-fabrication "trimming" of the resonant condition of optical ring resonators can be performed, for example, by the removal/addition of material from the optical ring resonators. This can be achieved using thin film deposition, etching, or laser ablation. In all cases, it is required that a local structure of the optical ring resonator be physically altered with precision on the order of hundreds of nanometers, which can be challenging, time consuming and not compatible with a thick cladding layer generally used with optical ring resonators.

SUMMARY

The present specification provides a device and method for post-fabrication trimming of an optical ring resonator using a dopant-based heater. Such trimming occurs, not through the alteration of a physical structure of the optical ring resonator, but through the use of a heater located within the optical ring resonator in an optical slab from which the optical ring resonator extends. The heater comprises a locally doped portion of the semiconductor of the optical slab having a non-uniform doping profile, for example with dopant peaks and/or regions of higher dopant concentration relative to the remainder of the heater. The locally doped portion of the semiconductor of the optical slab can extend into the optical ring resonator. The device further comprises electrical connections to the heater. A given set of electrical conditions are used to apply power to the heater, causing the dopant to migrate relative to the optical ring resonator, and thereby changing a concentration of the dopant within the optical ring resonator. In particular, an initial resonance frequency of the optical ring resonator is measured, and a target resonance frequency identified; the heater is then operated based on a set of electrical parameters which will cause the initial resonance frequency to shift to the target resonance frequency. For example, for a given dopant profile, electrical parameters that will cause given resonance frequency shifts can be provisioned in a memory, and a subset of the electrical parameters can be selected to operate the heater which will cause the desired resonance frequency shift. In this manner, resonance frequencies of one or more optical ring resonators on an optical bus can be shifted to precisely space their frequencies. Hence, local heating of each optical ring resonator during later operation of the one or more optical ring resonators in a telecommunication system can be obviated.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a device comprising: a substrate comprising a semiconductor on insulator structure; an optical slab on the insulator, the optical slab formed from the semiconductor; an optical input, an optical output, at least one optical bus there between, and an optical ring resonator coupled to the at least one optical bus and extending from the optical slab; a heater in the optical slab and within at least a portion of the optical ring resonator, the heater extending between at least an inner diameter and an outer diameter of the optical ring resonator, the heater comprising a dopant having a non-uniform profile in the semiconductor; electrical connections to the heater; a memory storing predetermined electric parameters of the heater which, when applied to the heater, will cause the dopant in the heater to diffuse relative to the optical ring resonator, thereby inducing a shift in the resonance of the optical ring resonator as a result of changing a concentration of the dopant within the optical ring resonator, the predetermined electric parameters stored as a function of resonance frequency shift in the optical ring resonator during heating; and, a controller in communication with the heater using the electrical connections, the controller configured to: determine an initial resonance frequency of the optical ring resonator; determine a subset of the predetermined electric parameters at which to operate the heater based on the initial resonance frequency and a target resonance frequency; and apply the subset of the predetermined electric parameters to the heater using the electrical connections to shift a resonance frequency of the optical ring resonator from the initial resonance frequency to the target resonance frequency.

The non-uniform profile of the dopant can comprise at least one peak on either side of the inner diameter and the outer diameter of the optical ring resonator.

The non-uniform profile of the dopant can comprise at least one peak between the inner diameter and the outer diameter of the optical ring resonator.

The device can further comprise a second dopant in the heater, and the predetermined electric parameters of the heater can be further correlated with inducing shifts in the resonance of the optical ring resonator as a result of changing a concentration of the second dopant within the optical ring resonator during heating.

The predetermined electric parameters of the heater can be further correlated with inducing shifts in the resonance of the optical ring resonator as a result of changing one or more of concentration and physical properties of lattice defects within the optical ring resonator during heating.

The predetermined electric parameters of the heater can be further correlated with inducing shifts in the resonance of the optical ring resonator as a result of exposing at least the optical ring resonator to a reactive gas during heating.

The dopant can comprise a p-type dopant.

The dopant can comprise an n-type dopant.

The dopant can comprise a deep-level dopant.

The optical ring resonator can comprise an optical filter and the heater can extend around a substantial portion of the optical filter.

The optical ring resonator can comprise an optical modulator, and the device can further comprise a voltage control device around a first portion of the optical modulator, and the heater around a second portion of the optical modulator, the first portion longer than the second portion.

A ratio of respective thicknesses of the optical ring resonator and the optical slab can be greater than or equal to about 2-to-1.

The device can further comprise an optical input, on the optical bus, the optical input configured to receive an optical signal which conveys the optical signal to the optical ring resonator.

The device can further comprise a light source configured to provide an optical signal to the optical bus, which conveys the optical signal to the optical ring resonator.

The device can further comprise a capping layer on the optical ring resonator and the optical bus.

Another aspect of the specification provides a method comprising: at a device comprising: a substrate comprising a semiconductor on insulator structure; an optical slab on the insulator, the optical slab formed from the semiconductor; an optical input, an optical output, at least one optical bus there between, and an optical ring resonator coupled to the at least one optical bus and extending from the optical slab; a heater in the optical slab and within at least a portion of the optical ring resonator, the heater extending between at least an inner diameter and an outer diameter of the optical ring resonator, the heater comprising a dopant having a non-uniform profile in the semiconductor; electrical connections to the heater; a memory storing predetermined electric parameters of the heater which, when applied to the heater, will cause the dopant in the heater to diffuse relative to the optical ring resonator, thereby inducing a shift in the resonance of the optical ring resonator as a result of changing a concentration of the dopant within the optical ring resonator, the predetermined electric parameters stored as a function of resonance frequency shift in the optical ring resonator during heating; and, a controller in communication with the heater using the electrical connections, determining, at the controller, an initial resonance frequency of the optical ring resonator; determining, at the controller, a subset of the predetermined electric parameters at which to operate the heater based on the initial resonance frequency and a target resonance frequency; and applying, using the controller, the subset of the predetermined electric parameters to the heater using the electrical connections to shift a resonance frequency of the optical ring resonator from the initial resonance frequency to the target resonance frequency.

Another aspect of the specification provides a non-transitory computer-readable medium storing a computer program, wherein execution of the computer program is for: at a device comprising: a substrate comprising a semiconductor on insulator structure; an optical slab on the insulator, the optical slab formed from the semiconductor; an optical input, an optical output, at least one optical bus there between, and an optical ring resonator coupled to the at least one optical bus and extending from the optical slab; a heater in the optical slab and within at least a portion of the optical ring resonator, the heater extending between at least an inner diameter and an outer diameter of the optical ring resonator, the heater comprising a dopant having a non-uniform profile in the semiconductor; electrical connections to the heater; a memory storing predetermined electric parameters of the heater which, when applied to the heater, will cause the dopant in the heater to diffuse relative to the optical ring resonator, thereby inducing a shift in the resonance of the optical ring resonator as a result of changing a concentration of the dopant within the optical ring resonator, the predetermined electric parameters stored as a function of resonance frequency shift in the optical ring resonator during heating; and, a controller in communication with the heater using the electrical connections, determining, at the controller, an initial resonance frequency of the optical ring resonator; determining, at the controller, a subset of the predetermined electric parameters at which to operate the heater based on the initial resonance frequency and a target resonance frequency; and applying, using the controller, the subset of the predetermined electric parameters to the heater using the electrical connections to shift a resonance frequency of the optical ring resonator from the initial resonance frequency to the target resonance frequency.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 1 schematically depicts a respective initial resonance frequency of four optical ring resonators on an optical bus and a position of a plurality of frequencies which are to be filtered by the optical ring resonators, according to non-limiting implementations.

Figure 4:
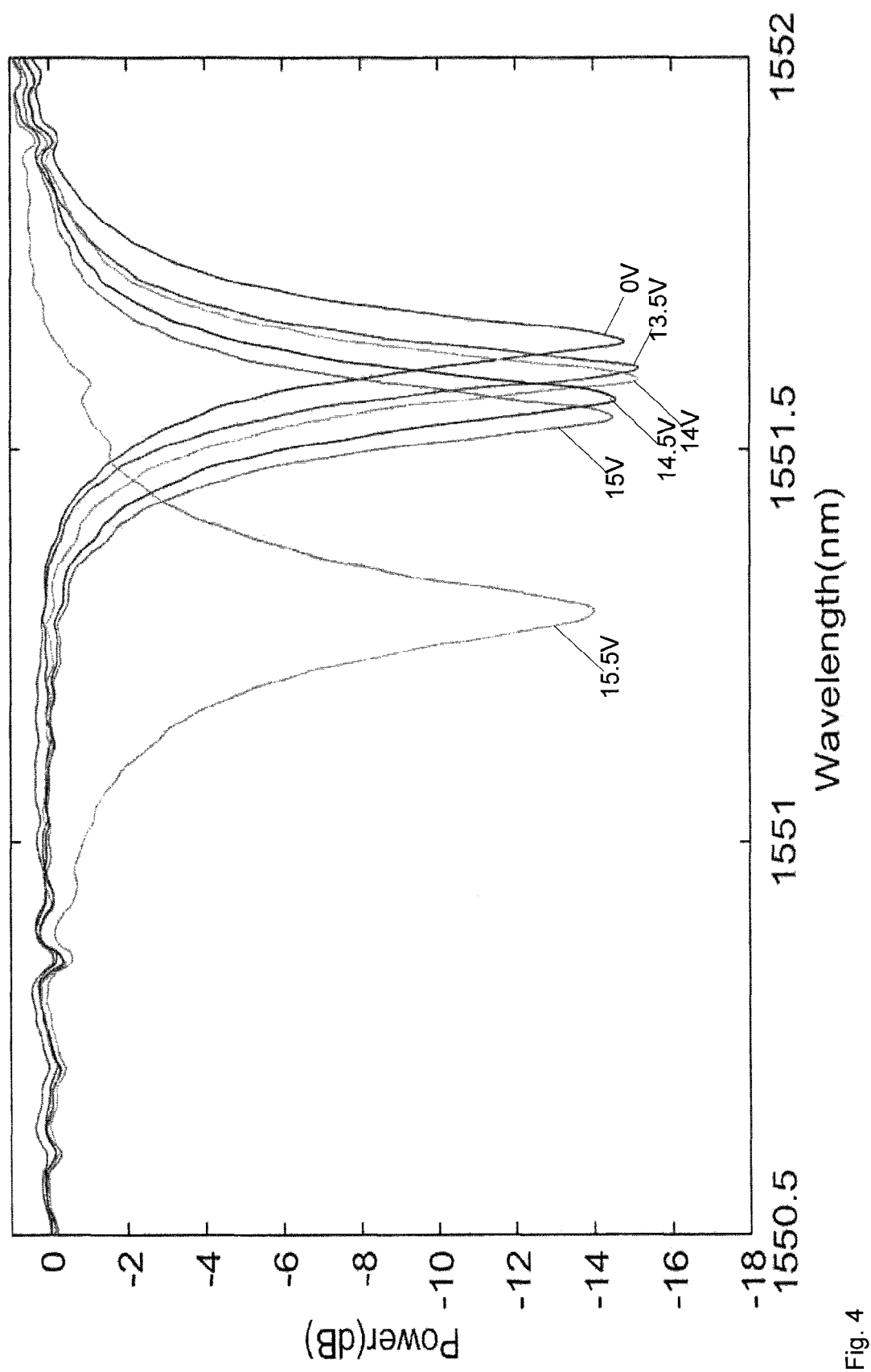
FIG. 4 depicts experimental results of applying different electrical parameters to a given optical ring resonator fabricated using a silicon-on-insulator structure, and in which 20% of the circumference of the ring was covered by heater in an optical slab that had non-uniform boron doping profile, according to non-limiting implementations.
Figure 5:
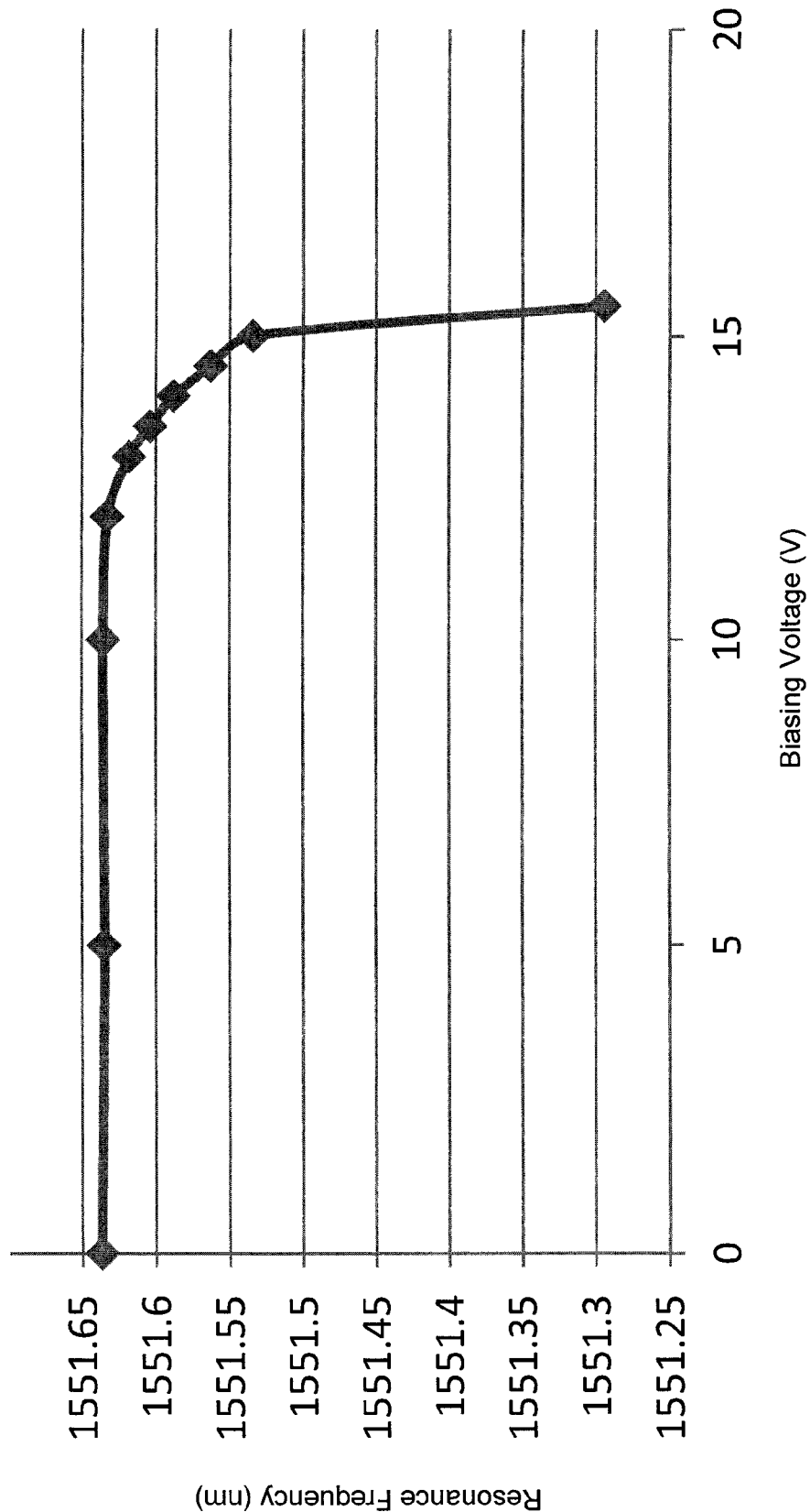

FIG. 5 summarizes the experimental results of FIG. 4, depicting the shift in resonance frequency as a function of biasing voltage, according to non-limiting implementations.

Figure 6:
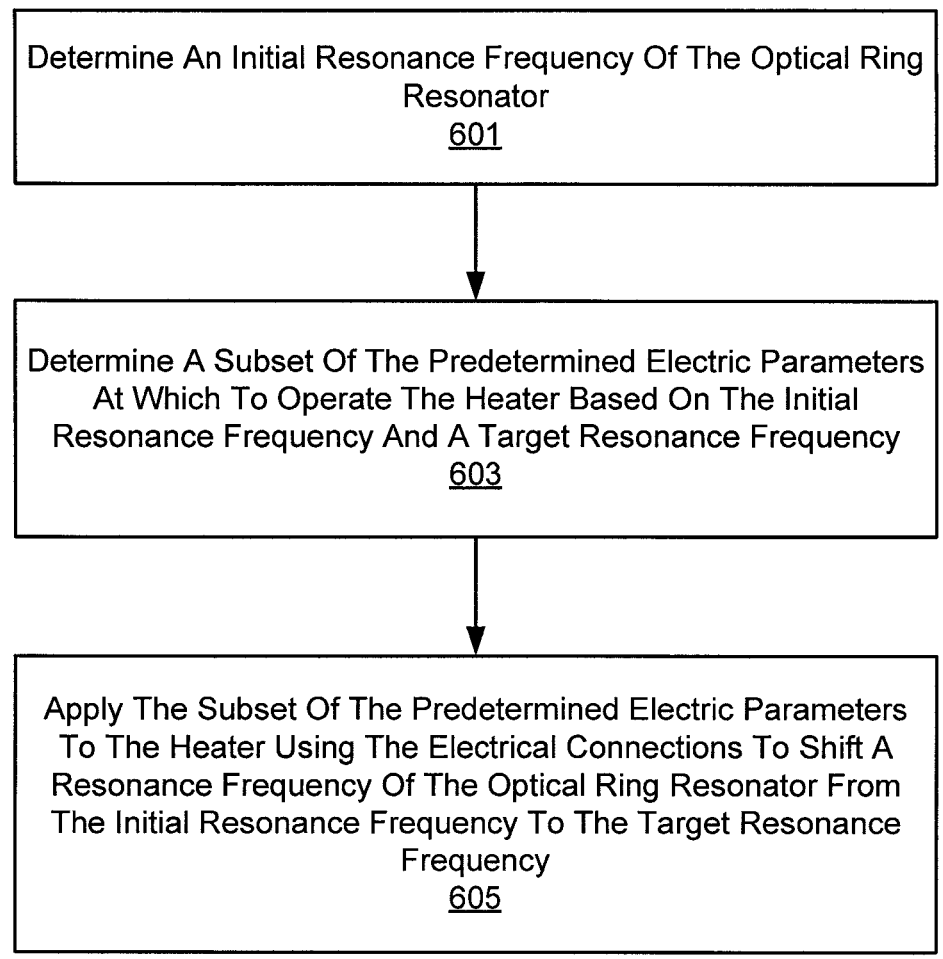

FIG. 6 depicts a block diagram of a flowchart of a method of post-fabrication trimming of an optical ring resonator using a dopant-based heater, according to non-limiting implementations.

Figure 1:
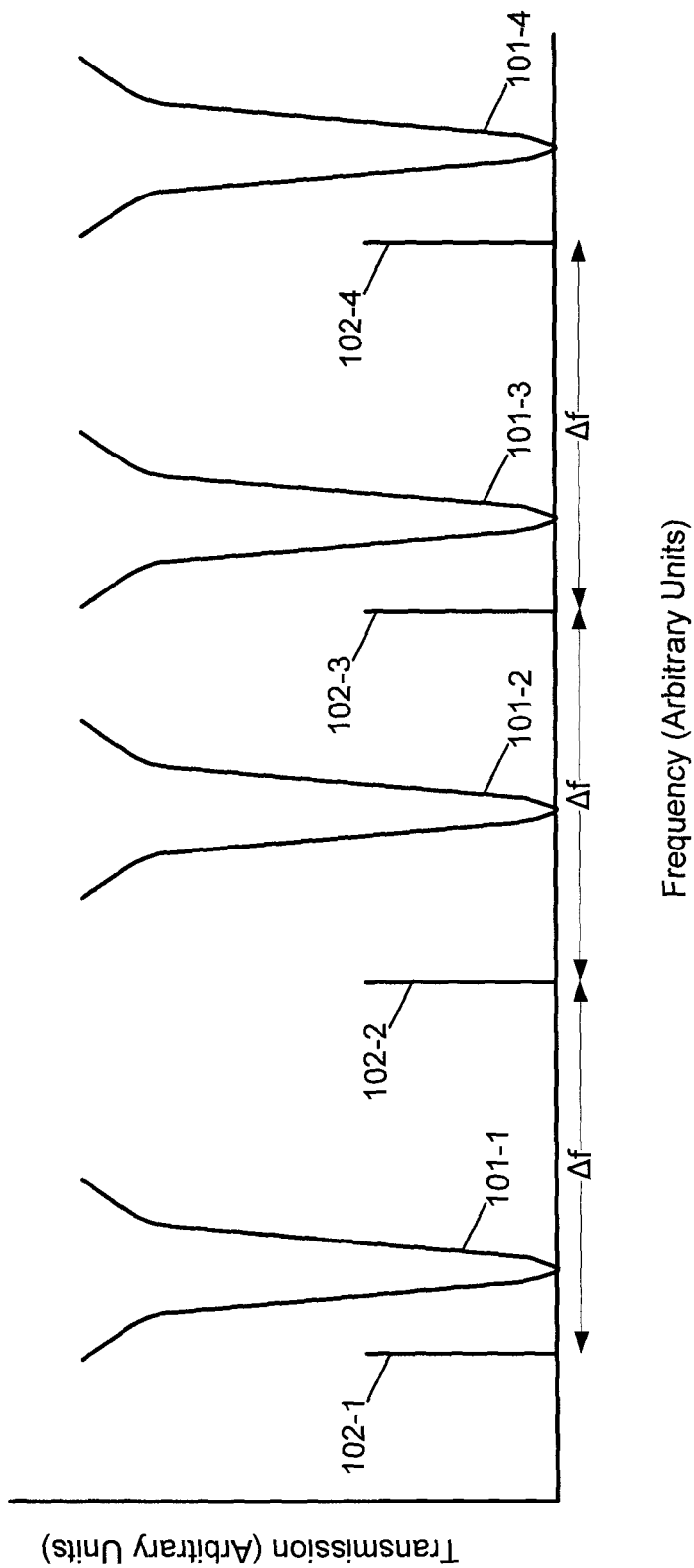
Figure 7:
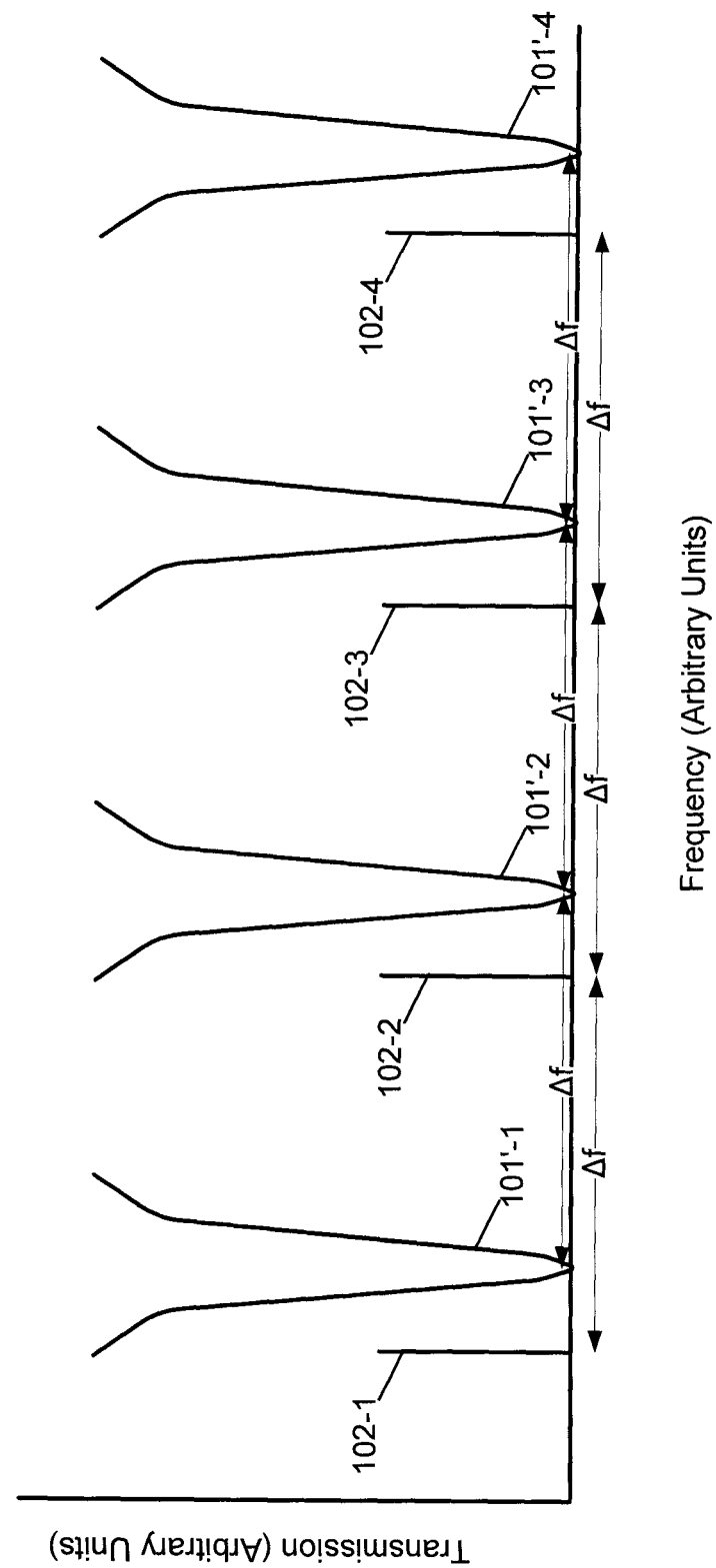

FIG. 7 depicts the resonance frequency of the four optical ring resonators represented by FIG. 1 after the method of FIG. 6 has been used to perform post-fabrication trimming, according to non-limiting implementations.

Figure 8:
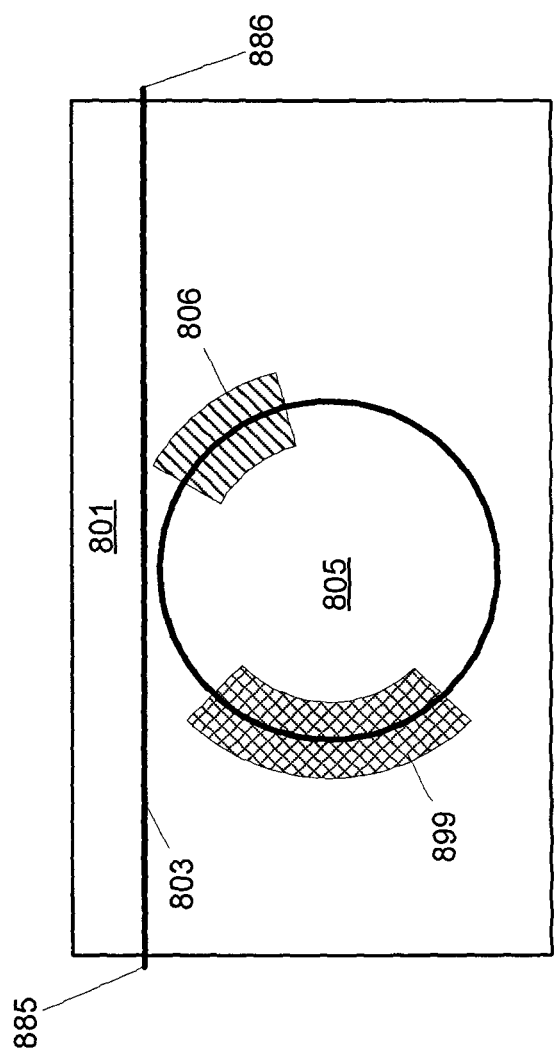

FIG. 8 depicts a device that includes an optical ring modulator that can be trimmed using the method of FIG. 6, according to non-limiting implementations.

Figure 2:
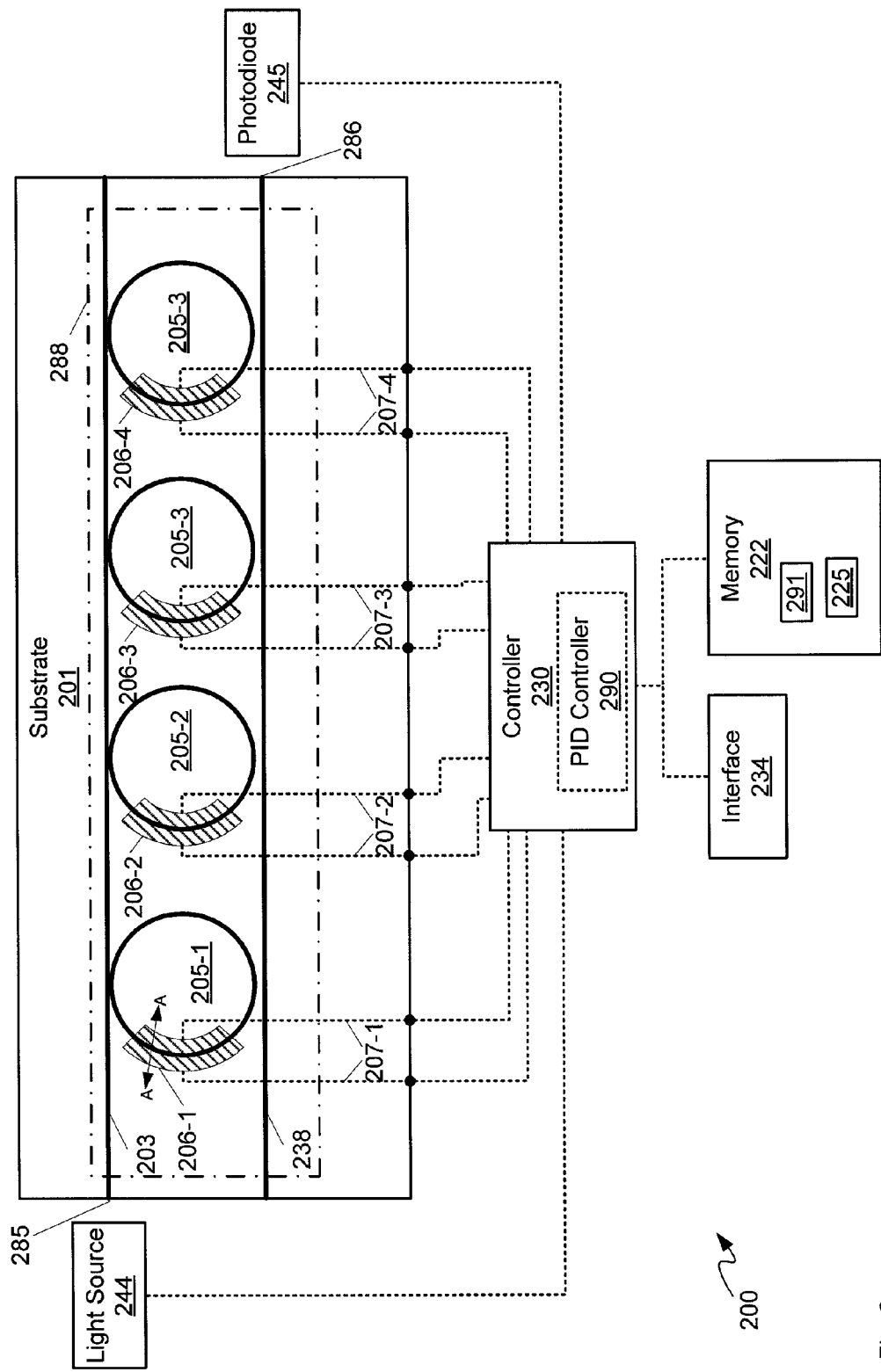
FIG. 2 depicts a schematic diagram of a device for post-fabrication trimming of an optical ring resonator using a dopant-based heater, according to non-limiting implementations.
Figure 9:
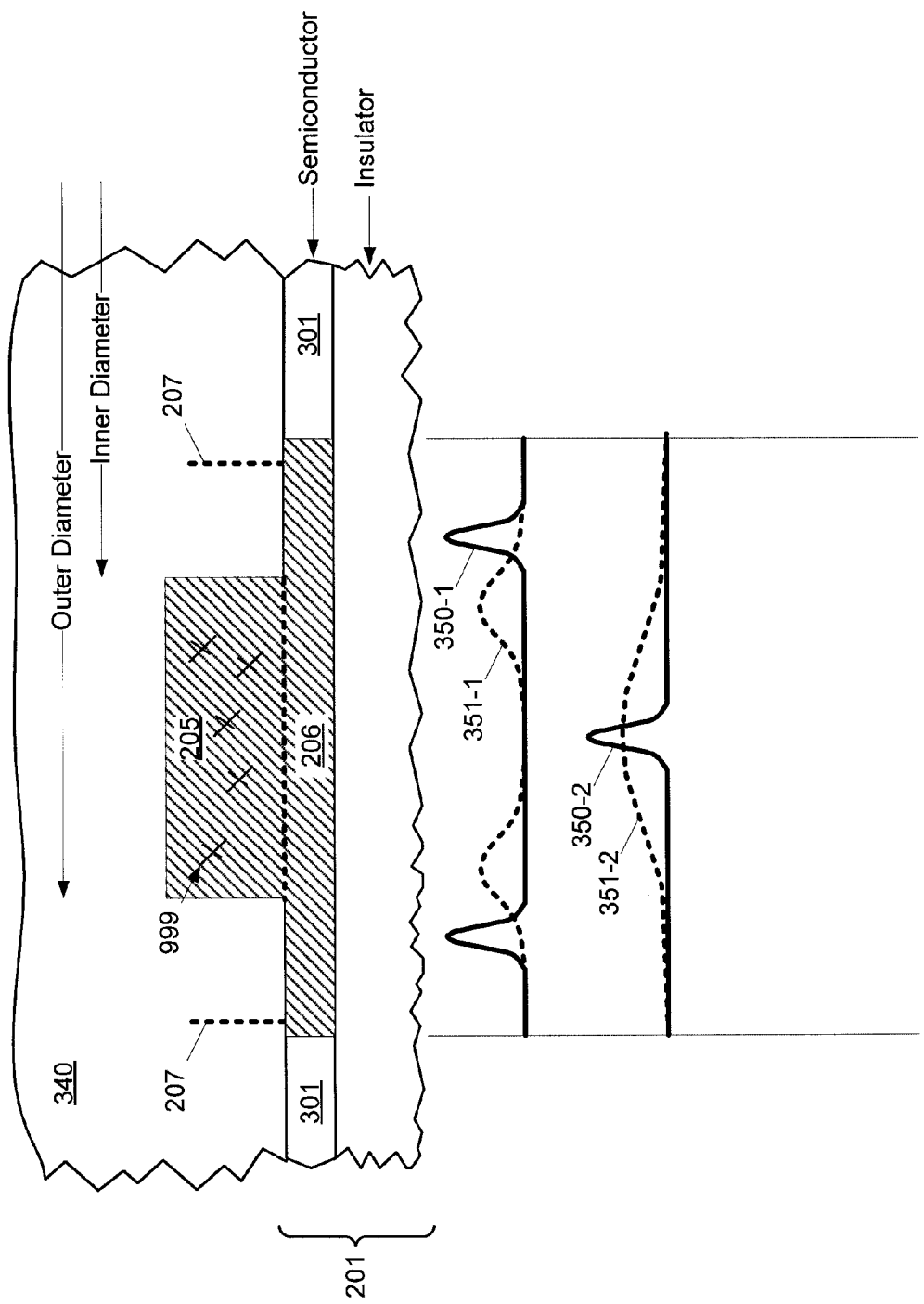

FIG. 9 depicts a cross-section of a portion of an optical ring resonator of the device of FIG. 2, through a line A-A, which has been modified to include lattice defects, according to non-limiting implementations.

Figure 10:
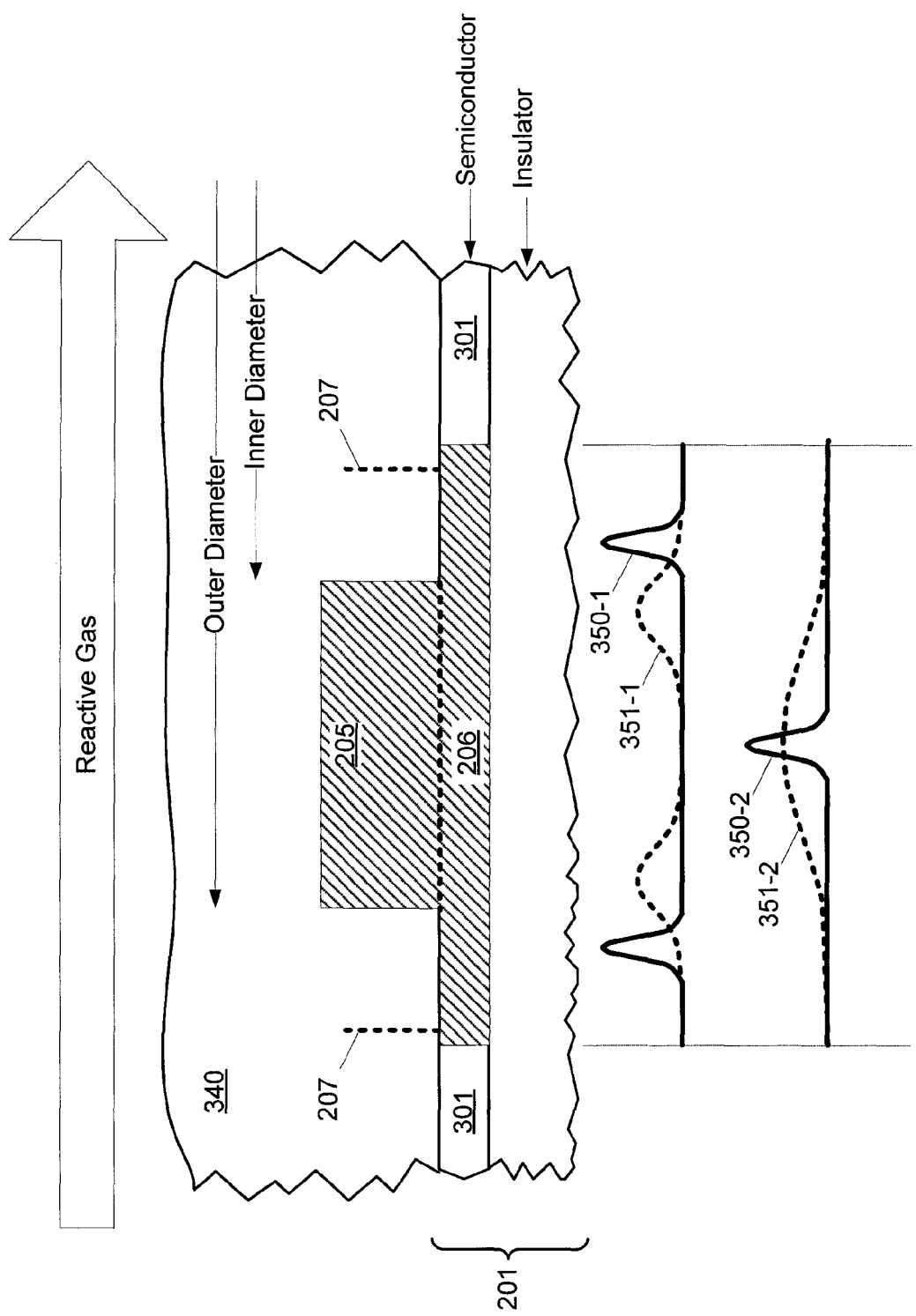

FIG. 10 depicts a cross-section of a portion of an optical ring resonator of the device of FIG. 2, through a line A-A which is being heated in the presence of a reactive gas, according to non-limiting implementations.

DETAILED DESCRIPTION

Techniques for fabricating optical devices, such as optical ring resonators, which can include optical ring filters and optical ring modulators, are not necessarily precise, and hence frequency constant spacing of a plurality of optical ring resonators coupled to an optical bus can be challenging. For example, FIG. 1 schematically depicts a respective initial resonance frequency 101-1, 101-2, 101-3, 101-4 of four optical ring resonators on an optical bus (e.g. see FIG. 2 below), and a position of a plurality of frequencies 102-1, 102-2, 102-3, 102-4, which are to be filtered by the optical ring resonators. For clarity, respective initial resonance frequencies 101-1, 101-2, 101-3, 101-4 will be interchangeably referred to hereafter, collectively, initial resonance frequencies 101 and, generically, as an initial resonance frequency 101. Similarly, plurality of frequencies 102-1, 102-2, 102-3, 102-4 will be interchangeably referred to hereafter, collectively frequencies 102 and, generically, as frequency 102. Furthermore, it is appreciated that FIG. 1 is not necessarily to scale.

While only four frequencies 102 are depicted, the light source emitting frequencies 102 can emit more than four frequencies 102, but only frequencies 102 are to be filtered, and/or modulated, by the optical ring resonators represented by initial resonance frequencies 101. Any other frequencies on the optical bus to which the optical ring resonators are coupled can be dumped into a light dump (not depicted). In particular, FIG. 1 depicts transmission of light, in arbitrary units, on an optical bus as a function of frequency, also in arbitrary units; the reduction and/or resonance peak represented by each respective initial resonance frequency 101 occurs due to the interaction of each optical ring resonator with the optical bus as light at each resonates at a respective optical ring resonator.

As is understood from FIG. 1, adjacent frequencies 102 are separated by a constant frequency spacing $\Delta f$, for example 50 GHz, 200 GHz, or any frequency spacing $\Delta f$ output of a light source outputting four frequencies 102. As is also understood from FIG. 1, initial resonant frequencies 101 not only do not align with any of frequencies 102, but are not at constant frequency spacing $\Delta f$. While the exact relative position of each of initial resonance frequencies 101 can be globally controlled using a global heater heating all the optical ring resonators to a same temperature, even if one initial resonance frequency 101 was aligned with one frequency 102, the remainder of the initial resonance frequencies 101 would not align with the remaining frequencies 102.

To address this problem, and shift initial resonance frequencies 101 to target resonance frequencies that are spaced, for example, by constant frequency spacing $\Delta f$, optical ring resonators can be "trimmed" using a respective heater having a non-uniform doping profile, in an optical slab upon which the optical ring resonators are fabricated to a particular target resonance frequency, to control a respective resonance frequency of optical ring resonator, as described hereafter. Furthermore, as one of the problems addressed herein is to trim optical ring resonators such that their resonant frequencies are separated by a constant frequency spacing (e.g. commensurate with an optical telecommunication system), devices, systems and methods described herein can be particularly useful with devices comprising two or more optical ring resonators coupled to an optical bus.

Figure 3:
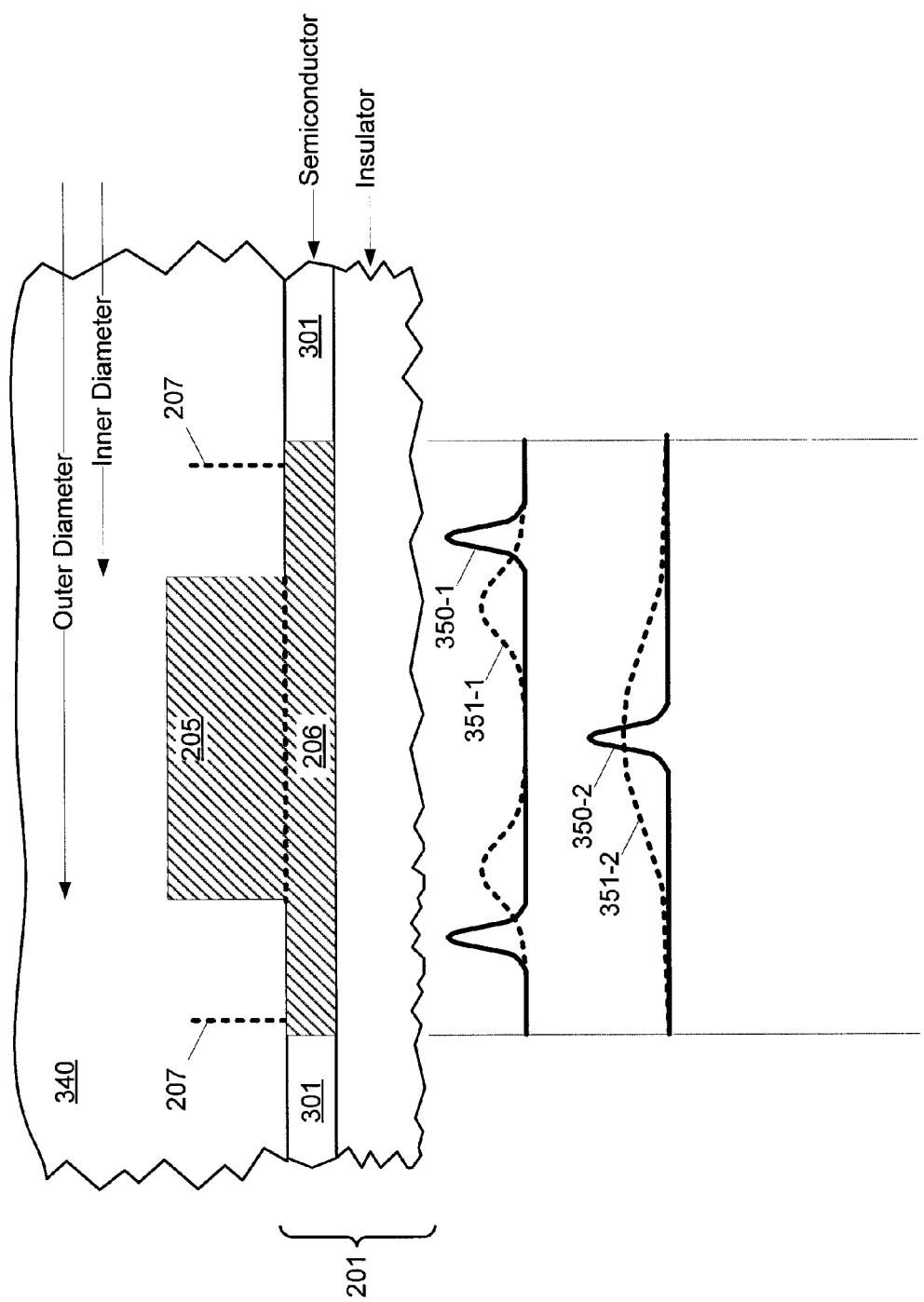
FIG. 3 depicts a cross-section of a portion of an optical ring resonator of the device of FIG. 2, through a line A-A, as well as example non-uniform doping profiles of a heater thereof, according to non-limiting implementations.

Attention is hence directed to FIG. 2 and FIG. 3: FIG. 2 depicts a device 200, and FIG. 3 depicts a cross-section of a portion of device 200 through a line A-A of FIG. 2. Device 200 comprise: a substrate 201 comprising a semiconductor on insulator structure (as best seen in FIG. 3); an optical slab 301 on the insulator, optical slab 301 formed from the semiconductor (as also best seen in FIG. 3); an optical input 285, an optical output 286, at least one optical bus 203, 238 there between, one or more optical ring resonators 205-1, 205-2, 205-3, 205-4 coupled to at least one optical bus 203, 238, and extending from optical slab 301; one or more heaters 206-1, 206-2, 206-3, 206-4 in optical slab 301, in a one-to-one relationship with one or more optical ring resonators 205-1, 205-2, 205-3, 205-4, and within at least a portion of a respective optical ring resonator 205-1, 205-2, 205-3, 205-4, one or more heaters 206-1, 206-2, 206-3, 206-4 extending between at least an inner diameter and an outer diameter of a respective optical ring resonator 205-1, 205-2, 205-3, 205-4, one or more heaters 206-1, 206-2, 206-3, 206-4 comprising a dopant having a non-uniform profile in the semiconductor; electrical connections 207-1, 207-2, 207-3, 207-4 to each of one or more heaters 206-1, 206-2, 206-3, 206-4; a memory 222 storing predetermined electric parameters 225 of one or more heaters 206-1, 206-2, 206-3, 206-4 which, when applied to one or more heaters 206-1, 206-2, 206-3, 206-4, will cause a respective dopant in one or more heaters 206-1, 206-2, 206-3, 206-4 to diffuse relative to a respective optical ring resonator 205-1, 205-2, 205-3, 205-4, thereby inducing a shift in the resonance of the respective optical ring resonator 205-1, 205-2, 205-3, 205-4 as a result of changing a concentration of the respective dopant within the respective optical ring resonator 205-1, 205-2, 205-3, 205-4, the predetermined electric parameters 225 stored as a function of resonance frequency shift in an optical ring resonator during heating; a controller 230 in communication with the one or more heaters 206-1, 206-2, 206-3, 206-4 using respective electrical connections 207-1, 207-2, 207-3, 207-4, controller 230 configured to: determine a respective initial resonance frequency of each of the one or more optical ring resonators 205-1, 205-2, 205-3, 205-4; determine a respective subset of the predetermined electric parameters 225 at which to operate each of one or more heaters 206-1, 206-2, 206-3, 206-4 based on the respective initial resonance frequency and a respective target resonance frequency; and apply the respective subset of the predetermined electric parameters 225 to each of the one or more heaters 206-1, 206-2, 206-3, 206-4 using the respective electrical connections 207-1, 207-2, 207-3, 207-4 to shift a resonance frequency of the one or more optical ring resonators 205-1, 205-2, 205-3, 205-4 from the respective initial resonance frequency to the respective target resonance frequency.

For clarity, in FIG. 2 and throughout the present specification, solid lines connecting components depict links and/or optical busses (interchangeably referred to as optical waveguides) that include flow of optical signals there between, while stippled lines connecting components depict links that include flow of electrical data and/or electrical signals there between.

Further, for clarity, one or more optical ring resonators 205-1, 205-2, 205-3, 205-4 will be interchangeably referred to hereafter, collectively, as optical ring resonators 205 and, generically, as an optical ring resonator 205. Similarly, one or more heaters 206-1, 206-2, 206-3, 206-4 will be interchangeably referred to hereafter, collectively, as heaters 206 and, generically, as a heater 206. Similarly, electrical connections 207-1, 207-2, 207-3, 207-4 will be interchangeably referred to hereafter, collectively, as electrical connections 207, and, generically, as an electrical connection 207.

Furthermore, while device 200 comprises four optical ring resonators 205 (and associated heaters 206 and electrical connections 207), device 200 can comprise as few as one optical ring resonator 205 (and hence one associated heater 206 and respective electrical connections 207), or more than four optical ring resonators 205 (and associated heaters 206 and electrical connections 207). However, device 200 can be particularly useful when device 200 comprises two or more optical ring resonators 205, each intended to resonate with a respective frequency of an integrated and/or dedicated light source emitting frequencies commensurate with optical telecommunications systems, as described in more detail below. As will also be described in more detail below, device 200 can be configured to filter a plurality of frequencies input to optical bus 203, and hence a number of optical ring resonators 205 at device 200 can correspond to the number of frequencies to be filtered. For example, each optical ring resonator 205 can be configured to resonate at one of frequencies 101. Furthermore, while each optical ring resonator 205 is depicted as circular, one or more of optical ring resonators 205 can be other ring shapes including, but not limited to, oval, a racetrack shape, and the like.

As depicted, device 200 further comprises an interface 234 interconnected with controller 230, a light source 244, and a photodiode 245. As depicted, device 200 further comprises optical input 285 to optical bus 203, and an optical output 286 of output bus 238, and optical resonators 205 are coupled to each of optical bus 203 and output bus 238, each of optical ring resonators 205 configured to "drop" and/or convey light and/or an optical signal of a given respective frequency from optical bus 203 to output bus 238.

Light source 244 is configured to provide an optical signal to optical bus 203, which conveys the optical signal to the optical ring resonators 205; hence, light source 244 is located to emit the optical signal to optical input 285. Each optical ring resonator 205 can be configured to filter and/or convey a particular frequency of the optical signal to output bus 238, as described in more detail below, which conveys filtered optical signals to optical output 286, which can be measured by photodiode 245. Hence, photodiode 245 is arranged to receive an output optical signal from optical output 286.

Each of optical input 285 and optical output 286 can comprise one or more of an optical coupler, a PIC (photonic integrated circuit) facet and the like. Indeed, at least optical bus 203 and optical ring resonator 205 can be formed from a photonic integrated circuit (PIC), and any components of device 200 that convey and/or interact with optical signals can be formed from a PIC. In particular non-limiting implementations, components of device 200 that convey and/or interact with optical signals can be formed from a silicon based PIC, however other materials are within the scope of present implementations.

Furthermore, as depicted controller 230 can further comprise an optional proportional-integral-derivative (PID) controller 290; as such, in some implementations controller 230 can implement feedback loops using PID controller 290, for example to control heater 206 to a given set of electrical parameters 225 and/or light source 244 to a given optical power, however other types of controllers are within the scope of present implementations. When present, PID controller 290 generally calculates an "error value" as the difference between a measured process variable and a desired set point, and attempts to minimize the error over time by adjustment of a control variable, such as power supplied to heater 206, to a new value determined by a weighted sum. However, other types of controllers and/or control mechanisms (and/or feedback loops) are within the scope of present implementations.

In some implementations, components of device 200, other than those of substrate 201, can comprise an automated test bench used to "trim" a resonance frequency of optical ring resonators 205. In these implementations, as depicted in FIG. 2, electrical connections 207 to each heater 206 can terminate at an edge and/or a surface of substrate 201 (and/or at a surface of a capping layer) and electrical connections between controller 230 and heaters 206 can occur using pins of an automated trimming test bench connecting to electrical connections 207. Indeed, as electrical connections 207 are intended for one-time use, dedicated electrical connections to controller 230 and each heater 206 can be superfluous. Furthermore, while in FIG. 2, controller 230 is depicted as simultaneously connecting to each heater 206, in implementations where substrate 201 is trimmed using an automated test bench, connections between controller 230 and each heater 206 can occur in a sequence.

In other words, at least a portion of device 200 can generally comprise a component in an optical telecommunications system, and/or components which can be integrated into optical telecommunications devices including, but not limited to substrate 201 and optical components thereof. As such, it is generally desired that resonance frequencies of optical ring resonators 205 each comprise a given carrier optical frequency including, but not limited to, an optical frequency used in optical telecommunications in a range of about 284.5-238 THz; however other optical frequencies, and associated wavelengths, are within the scope of present implementations. Alternatively, it is desired that a frequency spacing of the resonant frequencies of optical ring resonators 205 be compatible with a frequency spacing of a light source used in optical telecommunications device. The trimming process, described below, can be used to achieve such spacing.

Regardless, at least substrate 201 can be further configured to optically interface with an optical fiber (e.g. at optical output 286), and output from each optical ring resonator 205 can be transmitted through the optical fiber, which can be hundreds of kilometers long (or more). The output can further be modulated to encode data therein, either at substrate 201 (using further optical ring resonators and/or modulators) or external to substrate 201. In other words, as described below, optical ring resonators 205 can be modified to include a device which modulates optical signals resonating at each optical ring resonator 205.

Hence, in these implementations, at least the substrate can comprise a modulating optical signal generator including, but not limited to, one or more lasers (which can include light source 244, and which can be internal or external (as depicted) to substrate 201), one or more of the lasers comprising tunable lasers, one more light emitting diodes (LEDs), and the like, as well as one or more interfaces (such as interface 234) to data generating devices, including, but not limited to, servers, personal computers, laptops, mobile devices and the like, and the like. In yet further implementations, light source 244 a plurality of light sources, each emitting one or more optical signals of different frequencies and/or different frequency ranges, and a combiner for combing light therefrom.

It should be emphasized, however, that the structure of device 200 in FIG. 2 is purely an example, and contemplates a device that can be used for resonance frequency trimming.

Controller 230 can comprise a processor and/or a plurality of processors, including but not limited to one or more central processors (CPUs) and/or one or more processing units; either way, controller 230 comprises a hardware element and/or a hardware processor. Indeed, in some implementations, controller 230 can comprise an ASIC (application-specific integrated circuit) and/or an FPGA (field-programmable gate array) specifically configured to implement the functionality of controller 230. Hence, controller 230 is not necessarily a generic computing device and/or a generic processor and/or a generic component of computing controller 230, but a device specifically configured to implement specific functionality; such specific functionality includes controlling optical ring resonator 205 in a feedback loop to a given insertion loss as described in further detail below. For example, controller 230 can specifically comprise an engine configured to control ring in a feedback loop to a given insertion loss.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of controller 230 and/or device 200 as described herein are typically maintained, persistently, in memory 222 and used by controller 230 which makes appropriate utilization of volatile storage during the execution of such programming instructions. Those skilled in the art recognize that memory 222 is an example of computer readable media that can store programming instructions executable on controller 230. Furthermore, memory 222 is also an example of a memory unit and/or memory module and/or a non-volatile memory.

In particular, memory 222 stores application 291 that when processed by controller 230 enables controller to: determine an initial resonance frequency of an optical ring resonator 205; determine a subset of predetermined electric parameters 225 at which to operate a respective heater 206 based on the initial resonance frequency and a target resonance frequency; and apply the subset of the predetermined electric parameters to heater 206 using respective electrical connections 207 to shift a resonance frequency of optical ring resonator 205 from the initial resonance frequency to the target resonance frequency.

Interface 234 can be optional; when present, interface can comprise any wired and/or wireless interface configured to receive data used to perform the trimming of optical ring resonators and alternatively modulate data. As such, interface 234 is configured to correspond with communication architecture that is used to implement one or more communication links used to receive data, including but not limited to any suitable combination of cables, serial cables, USB (universal serial bus) cables, and wireless links (including, but not limited to, WLAN (wireless local area network) links, WiFi links, WiMax links, cell-phone links, Bluetooth™ links, NFC (near field communication) links, packet based links, the Internet, analog networks, access points, and the like, and/or a combination). However, interface 234 is generally non-limiting and any interface used in automated test benches and/or optical telecommunication devices is within the scope of present implementations.

In any event, in present implementations, an initial resonance frequency of each optical ring resonator 205 is to be measured. In some implementations, for example when device 200 comprises an automated test bench, light source 244 can be configured to emit a range of frequencies within which the initial resonance frequencies of each optical ring resonator 205 is located, and output at optical output 286 of photodiode 245 can be measured as a function of frequency; peaks such as those depicted in FIG. 1 can be detected (though they can be inverted) to determine the initial resonance frequencies. Each of the peaks can be associated with a given optical ring resonator 205 by using each heater 206 to move each peak independent of one another.

Alternatively to measure resonance frequencies of optical ring resonators 205, light source 244 can be controlled to scan through a range of frequencies and photodiode 245 can measure the resulting output, which would appear similar to FIG. 1, but inverted. A particular resonance peak can be associated with a particular optical ring resonator 205 by measuring output at diode while a given respective heater 206 is operating under electrical conditions high enough to provide some modulation (albeit slow as compared to optical data rates) but below dopant migration temperatures; such modulation can be observed using photodiode 245.

Alternatively, while not depicted substrate 201 can further comprise one or more optical taps that diverts a fraction of the light from optical bus 203 and/or optical ring resonator 205 and/or output bus 238 to a respective photodiode to sample an optical signal thereupon such that a power of an optical signal at optical bus 203 and/or optical ring resonator 205 and/or output bus 238 can be monitored; indeed, optical taps on optical bus 203 can be located before and/or after optical ring resonator 205: optical taps before optical ring resonator 205 (e.g. between optical input 285 and optical ring resonator 205) can monitor an input optical signal, optical taps after optical ring resonator 205 (e.g. between optical output 286 and optical ring resonator 205) can monitor a filtered optical signal; an optical tap at optical ring resonator 205 can also measure the resonance thereof. Such optical taps can include, but are not limited to, fiber taps, beam splitters, bends in optical bus 203, as well as respective photodiodes arranged so that optical signals (e.g. light) from an optical tap illuminate a photodiode to produce an electrical signal which can be conveyed to controller 230 for processing. Such optical taps can be incorporated into a PIC structure of substrate 201.

In some implementations, light source 244 can comprise a distributed Bragg reflector laser, an external cavity laser and the like configured to output optical signals (e.g. light) of a plurality of different frequencies (and/or wavelengths), for example with a frequency constant spacing, into optical bus 203. Each optical ring resonator 205 can hence be fabricated with respective physical and optical properties that are meant to cause each optical ring resonator 205 to resonate at a different given frequency, and in particular with the same frequency constant spacing of the plurality of different frequencies of the optical signal.

Hence, when fabricated precisely, the resonance frequencies of the optical ring resonators 205 are spaced according to the frequency constant spacing of the optical signal (or multiples thereof), and hence each optical ring resonators 205 can filter a different one of frequencies of the optical signal onto output bus 238. Alternatively, when the resonance frequencies of the optical ring resonators 205 are spaced according to the frequency constant spacing of the optical signal, but are not otherwise aligned with each of the frequencies of the optical signal, a global heater 288 of device 200, as depicted in FIG. 2, can be used to heat all of the optical ring resonators 205 to achieve the alignment. Global heater 288 of device 200 can be fabricated on substrate 201 and/or brought into contact with substrate 201.

However, as such fabrication techniques are not precise enough to achieve the desired frequency constant spacing, each heater 206 is generally configured to heat a respective optical ring resonator 205, under control of controller 230, to cause a non-uniform dopant therein to diffuse relative to optical ring resonator 205 to shift a resonance wavelength of a respective optical ring resonator 205 from an initial resonance wavelength to a target resonance wavelength, for example to a resonance wavelength that is similar to a wavelength of the optical signal from light source 244.

Details of an optical ring resonator, 205, a heater 206, electrical connections 207 thereto, and substrate 201 are hence depicted in FIG. 3, which show a cross-section through a line A-A of FIG. 2. For example, FIG. 3 depicts that substrate 201 comprises a semiconductor on insulator structure, including, but not limited to, silicon-on-insulator, silicon-on-silicon oxide, and the like. For example, substrate 201 can comprise a silicon wafer upon which insulator is grown and/or deposited, and a layer of semiconductor is deposited on the insulator. Optical ring resonator 205 can be fabricated from the semiconductor layer using techniques such as photolithography, etching, and the like. While not depicted, optical bus 203, and output bus 238 can also be fabricated from the semiconductor layer using similar techniques and/or at the same time as optical ring resonator 205. Indeed, the entire optical structure on substrate 201 can be fabricated using similar techniques and/or at the same time.

The optical structure fabricated from the semiconductor includes optical slab 301 which is located between each optical ring resonator 205 and the insulator. In general, optical slab 301 is located across substrate 201. For example, optical slab 301 can be fabricated during etching of the semiconductor to form optical ring resonator 205 (and optical buses 203, 238 etc.); as such, optical ring resonator 205 extends from optical slab 301 and indeed, a portion of optical ring resonator 205 is located in optical slab 301, as represented by the horizontal stippled line; indeed, the horizontal stippled line is merely depicted to represent where optical ring resonator 205 extends from optical slab 301, and it is understood that light contained (and/or resonating in) optical ring resonator 205 is also present in the portion of optical slab 301 from which optical ring resonator 205 extends.

As such, to prevent cross-talk between optical ring resonators 205 through optical slab 301, adjacent optical ring resonators 205 are spaced a distance apart which prevents and/or minimizes such cross-talk. To further prevent cross-talk, a ratio of respective thicknesses of optical ring resonator 205 and optical slab 301 can be greater than or equal to about 2-to-1; for example, in specific non-limiting implementations, optical slab 301 can comprise silicon of a thickness of about 90 nm, and optical ring resonator 205 can also comprise silicon of a thickness of about 220 nm, which includes the thickness of optical slab 301. As also depicted in FIG. 3, device 200 can further comprise a capping layer 340 on optical ring resonator 205 and on optical bus 203, and output bus 238).

Nonetheless, as optical ring resonator 205 and heater 206 are each formed from the semiconductor, as described above, when optical ring resonator 205 is interacting with an optical signal, the optical signal will at least partially be contained in the heater 206 and/or optical slab 301 from which optical ring resonator 205 extends.

Heater 206 is fabricated in optical slab 301 by doping a region of optical slab 301 that extends on either side of a width of optical ring resonator 205 using, for example ion implantation techniques. As such, dopant extends throughout both heater 206 and the portion of optical ring resonator 205 around which heater 206 extends, and indeed, a portion of optical ring resonator 205 can form a portion of heater 206. As such, heater 206 is located in optical slab 301 and within at least a portion of optical ring resonator 205, heater 206 extending at least between at least an inner diameter and an outer diameter of optical ring resonator 205. For example, with reference briefly back to FIG. 2, in depicted implementations, each heater 206 is in an arcuate shape around a portion of the circumference of a respective optical ring resonator 205, for example at least around about 10% of the circumference of a respective optical ring resonator 205.

Returning to FIG. 3, it is apparent that electrical connections 207 for a heater 206 are located on either side of the inner diameter and an outer diameter of optical ring resonator 205, such that power can be applied across the heater 206.

For example, the semiconductor of the optical slab 301 comprising heater 206 is rendered at least partially conducting by doping the semiconductor of the optical slab 301 in the region of the heater 206 during fabrication, using any suitable doping technique. In general, dopant concentration levels in heater 206 cause the heater 206 to partially conduct, such that when power is applied thereto using electrical connections 207, a heater 206 produces heat. Such heat can cause the dopants in heater 206 to diffuse, presuming the dopant has a non-uniform doping profile in the semiconductor of the optical slab 301 in the region of heater 206.

In other words, heater 206 can be operated with predetermined electrical parameters 225 which will cause the dopant in heater 206 to diffuse relative to optical ring resonator 205, thereby inducing a shift in the resonance of optical ring resonator 205 as a result of changing a concentration of the dopant within optical ring resonator 205, the predetermined electric parameters stored, in memory 222, as a function of resonance frequency shift in optical ring resonator 205 during heating. Predetermined electrical parameters 225 will be described in further detail below.

FIG. 3 further depicts two example non-uniform profiles 350-1, 350-2 of a dopant that can be used in heater 206 and the portion of optical ring resonator 205 around which heater 206 extends. It is assumed herein that when a doping profile of heater 206 is described, that doping profile can extend into the portion of optical ring resonator 205 around which heater 206 extends. Non-uniform profile 350-1 of the dopant comprises at least one peak on either side of the inner diameter and the outer diameter of optical ring resonator 205. Non-uniform profile 350-2 of the dopant comprises at least one peak between the inner diameter and the outer diameter of optical ring resonator 205. In yet further implementations, the dopant profile of heater 206 (and the portion of optical ring resonator 205 around which heater 206 extends) can include one or more peaks on either side of the inner diameter and the outer diameter of optical ring resonator 205 and one or more peaks between the inner diameter and the outer diameter of optical ring resonator 205; in other words, non-uniform profiles 350-1, 350-2 can be at least partially combined.

FIG. 3 further depicts two example respective dopant profiles 351-1, 351-2 of the dopant that can occur after the heating process. In particular, dopant profile 351-1 corresponds to non-uniform dopant profile 350-1 after the heating process; in other words, the dopant in the peaks of dopant profile 350-1 has at least partially migrated within optical ring resonator 205 to change the optical properties, and hence the resonance frequency, thereof.

Similarly, dopant profile 351-2 corresponds to non-uniform dopant profile 350-2 after the heating process; in other words, the dopant in the peak of dopant profile 350-2 has changed and/or migrated within optical ring resonator 205 to change the optical properties, and hence the resonance frequency, thereof.

It is assumed that apart from the peaks of each non-uniform profile 350-1, 350-2, the dopant is at a non-zero concentration such that electrical current and/or power can be applied across electrical connections 207 to implement the heating process.

In some implementations the dopant can comprise a p-type dopant including, but not limited to, boron, aluminum, nitrogen, gallium, indium and the like, for example when the semiconductor comprises silicon.

In other implementations, the dopant can comprise an n-type dopant including, but not limited to, phosphorous, arsenic, antimony, bismuth, lithium and the like, for example when the semiconductor comprises silicon.

Furthermore, while specific non-uniform doping profiles are depicted in FIG. 3, other non-uniform doping profiles are within the scope of present implementations including, but not limited to, one or more peaks of dopant concentration, that can be symmetric or not symmetric with respect to each other and/or the optical ring resonator 205.

In addition, depending on a position, concentration and type of dopant in a peak, the resonance frequency can be blue-shifted (as described herein) or red-shifted. For example, in some implementations, when a dopant concentration relative to a centre (e.g. between an outer diameter and an inner diameter) of optical ring resonator 205 is reduced, a red-shift can be induced in a resonance of optical ring resonator 205; similarly, when a dopant concentration is increased, then a blue-shift can be induced. Hence, in some implementations, device 200 can comprise two separate heaters for optical ring resonator 205, each with different non-uniform doping profiles, one for inducing a red-shift and one for inducing a blue-shift; when an initial determination of a resonance of optical ring resonator 205 indicates whether a red-shift or a blue-shift is to be used to reach a target resonance, the appropriate heater can be used. Alternatively, each heater 206 at device 200 can be configured to induce only blue-shifts or only red-shifts.

In some implementations, heater 206 (and the portion of optical ring resonator 205 around which heater 206 extends) can comprise two dopants: a first dopant one with a relatively constant concentration across heater 206 (and the portion of optical ring resonator 205 around which heater 206 extends) to convey electrical current and/or power across electrical connections 207; and a second dopant having peaks in concentration similar to one or more non-uniform profiles 350-1, 350-2, and about zero and/or lower elsewhere. In other words, in these implementations, a first dopant can be used to implement the heating functionality of heater 206, and a second dopant can have peaks in concentration to such that the second dopant migrants during heating to change the optical properties, and hence the resonance frequency of optical ring resonator 205.

For example a first dopant with constant concentration can comprise a p-type dopant or an n-type dopant, as described above, and a second dopant can comprise a deep-level dopant including, but not limited to, gold and platinum.

However, other combinations of semiconductors and dopants are within the scope of present implementations. Furthermore, in some implementations, p-type dopants and n-type dopants can each be present at heater 206.

In particular, a degree of resonance shift for a given set of electrical parameters 225 can be predetermined, and stored at memory 222. For example, in present implementations, a plurality of optical ring resonators, similar to those of device 200, were fabricated and characterized, using different electrical parameters. Specifically, the optical ring resonators were tested heuristically to determine voltages, currents and/or powers, as well as time periods, that could be applied to respective heaters having given non-uniform dopant profiles as described above, to correlate electrical parameters with resonance frequency shifts of the optical ring resonators.

In particular, electric parameters of heaters of optical ring resonators were determined which, when applied to the heaters, would cause a dopant (e.g. in the heater and/or the portion of optical ring resonator 205 around which heater 206 extends) to diffuse relative to a respective optical ring resonator, thereby inducing a shift in the resonance of the optical ring resonator as a result of changing a concentration of the dopant within the optical ring resonator. The heuristically determined electric parameters were then stored in memory 222 of device 200, as predetermined electrical parameters 225, as a function of resonance frequency shift that occurs in an optical ring resonator during heating.

For example, attention is next directed to FIG. 4 which depicts experimental results of applying different electrical parameters to a given optical ring resonator fabricated using a silicon-on-insulator structure, and in which 20% of the circumference of the ring was covered by heater in an optical slab that had non-uniform boron doping profile similar to that of non-uniform profile 350-1. An initial resonance frequency of the optical ring filter was measured with a 0V bias on the heater.

For example FIG. 4 indicates the resonance peak of power as a function of frequency at 0V. A biasing voltage of 5V, 20V, 12V, 13V, 13.5V, 24V, 24.5V, 15V and 15.5V were each applied to the doped heater for about 30 seconds, in sequence, and returned to a 0 volt bias in between. The resonance of the optical ring resonator was measured after each biasing voltage was applied at the 0V bias, and FIG. 4 depicts the resonance of the optical ring resonator for each of 13.5V, 24V, 24.5V, 15V and 15.5V biasing voltages. As can be seen at FIG. 4, as the biasing voltage increased, the resonance of the optical ring resonator undergoes a blue shift. At 15.5V, the shift is more dramatic and indeed further application of voltages above 15.5V resulted in the optical ring resonator being destroyed as the silicon approached a melting point.

These experiments are further characterized in FIG. 5 which depicts resonance frequency of the optical ring resonator as a function of biasing voltage. In particular, the resonance frequency at a given biasing voltage is the frequency at the minima of each of the curves of FIG. 4. As can be seen in FIG. 5, between 0V and about 12V biasing voltage, no change in the resonance frequency occurs. Between about 12V and 13V, the resonance frequency starts to show a blue shift, and the change is almost linear between about 13V and 15V. Furthermore, a shift in resonance frequency of about 300 picometers was achieved without damage to the optical ring resonator.

Regardless of linearity, the shift in resonance frequency of the optical ring resonator is predictable, at least up to about 300 picometers, and hence electrical parameters that can be applied to the heater can be correlated with shifts in resonance frequency. As such, a memory, such as memory 222, can be populated with predetermined electrical parameters that can be applied to similar heaters of similar optical ring resonators to induce a shift in the resonance frequency thereof in order to perform post-fabrication "trimming" of the similar optical ring resonators, and without having to resort to physically changing the structure of the optical ring resonators. Furthermore, while only blue-shifts are described, in other implementations, red-shifts can be induced through appropriate selection of the non-uniform doping profile to reduce the dopant in optical ring resonator 205 when heating occurs.

Hence, for example, devices can be fabricated that are intended to be used as filters in optical telecommunication systems that have an optical input, an optical output, at least one optical bus there between and one more optical filters coupled to the at least one optical bus.

In implementations a controller and memory can be integrated with the device, the controller configured to implement application 291 and apply predetermined electrical parameters stored in the memory to heaters of respective optical rings as described herein. In such implementations, the controller can communicate with an external light source and an external photodiode to measure an initial resonance frequency of each optical ring resonator. The memory can further be configured with target resonance frequencies of each optical ring resonator and controller can determine from the stored target resonance frequencies and the initial resonance frequencies, a subset of the predetermined electrical parameters to select to operate the heater to induce a shift in the resonance frequencies of each of the optical ring resonators.

In other implementations, however, such trimming of each device can be performed at an automated test bench prior to integrating the device into a product, and the controller and the memory can be external to each device.

Attention is now directed to FIG. 6 which depicts a flowchart of a method 600 for trimming of an optical ring resonator using a dopant-based heater, according to non-limiting implementations. In order to assist in the explanation of method 600, it will be assumed that method 600 is performed using device 200, and specifically by controller 230, for example when controller 230 is implementing application 291. Indeed, method 600 is one way in which device 200 and/or controller 230 can be configured. Furthermore, the following discussion of method 600 will lead to a further understanding of device 200 and its various components and/or controller 230. However, it is to be understood that device 200 and/or controller 230 and/or method 600 can be varied, and need not work exactly as discussed herein in conjunction with each other, and that such variations are within the scope of present implementations.

Regardless, it is to be emphasized, that method 600 need not be performed in the exact sequence as shown, unless otherwise indicated; and likewise various blocks may be performed in parallel rather than in sequence; hence the elements of method 600 are referred to herein as "blocks" rather than "steps". It is also to be understood, however, that method 600 can be implemented on variations of device 200 as well.

At block 601, controller 230 determines an initial resonance frequency of an optical ring resonator 205. For example, as described above, controller 230 can control light source 244 to emit an optical signal onto optical bus 203, and measure a response of each optical ring resonator 205 using photodiode 245 (and/or optional taps).

At block 603, controller 230 determines a subset of predetermined electric parameters 225 at which to operate a heater 206 (e.g. of the optical ring resonator 205 having the initial resonance frequency determined at block 601) based on the initial resonance frequency and a target resonance frequency. For example, memory 222 and/or application 291 can comprise a target constant frequency spacing, such as constant frequency spacing Δf of optical ring resonators 205, and select a target resonance frequency for each based on the target constant frequency spacing. For example, controller 230 can determine a shift in resonance frequency that is to occur for each optical ring resonator 205 based on a difference between each the initial resonance frequency and target resonance frequency, and select a subset of predetermined electric parameters 225 that can be applied to a respective heater 206 to achieve such a shift.

At block 605, controller 230 applies the subset of the predetermined electric parameters 225 to the heater 206 using electrical connections 207 to shift a resonance frequency of optical ring resonator 205 from the initial resonance frequency to the target resonance frequency. In some instances, no heating occurs, for example when a resonance frequency of a given one of the optical ring resonators 205 is used as a reference frequency from which the resonance frequencies of the other optical ring resonators 205 are to be spaced.

For example, attention is next directed to FIG. 7, which is substantially similar to FIG. 1, with like elements having like numbers, and represents the resonance frequencies 101'-1, 101'-2, 101'-3, 101'-3 of optical ring resonators 205 after method 600 has been implemented, and after optical resonators 205 have been trimmed. In particular resonance frequency 101'-1 corresponds to unshifted resonance frequency 101-1, resonance frequency 101'-2 corresponds to shifted resonance frequency 101-2, resonance frequency 101'-3 corresponds to shifted resonance frequency 101-3, and resonance frequency 101'-4 corresponds to shifted resonance frequency 101-4. As further seen in FIG. 7, while resonance frequencies 101'-1, 101'-2, 101'-3, 101'-3 still do not align with frequencies 102, resonance frequencies 101'-1, 101'-2, 101'-3, 101'-3 are now spaced by the same constant frequency spacing Δf of frequencies 102. Hence, global heater 288 can be used to further shift resonance frequencies 101'-1, 101'-2, 101'-3 to align with frequencies 102, without the use of local heating, which can simplify the control loops of optical ring resonators 205 and can reduce the overall thermal load on optical ring resonators 205. Furthermore, trimming of optical ring resonators 205 using techniques described herein are achieved without the use of physically altering a geometric structure of optical ring resonators 205.

Persons skilled in the art will appreciate that there are yet more alternative implementations and modifications possible. For example, attention is next directed to FIG. 8, which depicts a substrate 801 having at least one optical ring resonator 805 that can also be trimmed using method 600. In particular, substrate 801 comprises an optical input 885, an optical output 886, at least one optical bus 803 there between, to which optical ring resonator 805 is coupled. Substrate 801 further comprises a heater 806 similar to heater 206. In other words, substrate 801 is similar to substrate 201 other than only one optical bus 803 is present, and only one optical ring resonator 805 is coupled thereto; however in other implementations, substrate 801 can comprise more than one optical ring modulator, similar to substrate 201. While not depicted, it is assumed that substrate 801 further comprises electrical connections to heater 806 and a global heater, similar to substrate 201.

In contrast to substrate 201, optical ring resonator 805 is configured to modulate a given optical signal on optical bus 803, and hence optical ring resonator 805 comprises an optical modulator, rather than an optical filter; for example, substrate 801 further comprises a voltage control device 899 around a first portion of the optical modulator/ring resonator 805, and heater 806 is around a second portion of optical modulator/ring resonator 805, the first portion longer than the second portion. Hence, compared to optical modulator/ring resonator 805 and heater 806, optical ring resonator 205 comprises an optical filter and heater 206 extends around a substantial portion of the optical filter.

While not depicted, it is further assumed that substrate 801 comprises electrical connections to voltage control device 899 and that voltage control device 899 comprises one or more of a pn junction and a capacitor across the first portion of optical modulator/ring resonator 805; a voltage across voltage control device 899 can be controlled by a controller (which can be integrated into substrate 801 or separate therefrom), to modulate the resonance frequency of optical modulator/ring resonator 805 and thereby encode data into a corresponding optical signal on optical bus 803. Regardless, a resonance frequency of optical modulator/ring resonator 805 can be trimmed prior to operation of optical modulator/ring resonator 805 using method 600, as described above. When substrate 801 comprises a plurality of optical modulators/ring resonators, similar to optical modulator/ring resonator 805, each can be trimmed as described above to control a frequency spacing there between.

Persons skilled in the art will appreciate that there are yet more alternative implementations and modifications possible. For example, electrical parameters 225 are generally correlated with inducing shifts in resonance of optical ring resonators for heaters having a given dopant profile. As described above, in some implementations, a second dopant can be present in a heater; in some of these implementations both a first dopant and a second dopant can have non-uniform profiles in the heater. Hence predetermined electric parameters 225 of a heater can be further correlated with inducing shifts in the resonance of an optical ring resonator as a result of changing a concentration of the second dopant within the optical ring resonator during heating.

In yet further implementations, an optical ring resonator can be fabricated having a given concentration of lattice defects. For example, attention is directed to FIG. 9, which is substantially similar to FIG. 3, with like elements having like numbers; however, in these implementations optical ring resonator 205 has been fabricated with lattice defects 999. Presuming such lattice defects 999 lead to predictable shifts in a resonance of optical ring resonator 205, and presuming that heating of optical ring resonator 205 can lead to a change in the lattice defects 999 (e.g. in effect, annealing optical ring resonator 205 to predictably reduce a concentration of lattice defects 999 and/or predictably change the resonance of optical ring resonator 205 due to a reduction in a concentration of lattice defects 999), such a change can also be correlated with shifts in a resonance of optical ring resonator 205. Hence, in these implementations, predetermined electric parameters 225 of heater 206 can be further correlated with inducing shifts in the resonance of optical ring resonator 205 as a result of changing one or more of the concentration and physical properties of lattice defects within optical ring resonator 205 during heating.

In some of these implementations, heating of optical ring resonator 205 to reduce a concentration of lattice defects 999, to shift a resonance of optical ring resonator 205 can be performed without introducing non-uniform dopant profiles in heater 206. Hence, in these implementations, predetermined electric parameters 225 of heater 206 can be correlated with inducing shifts in the resonance of optical ring resonator 205 as a result of changing one or more of a concentration and physical properties of lattice defects within optical ring resonator 205 during heating, without the use of non-uniform doping profiles.

Attention is next directed to FIG. 10, which is substantially similar to FIG. 3, with like elements having like numbers; however, in these implementations it is assumed that heater 206 is heating optical ring resonator 205 in the presence of a reactive gas. In these implementations, it is assumed that the properties of capping layer 340 and the reactive gas are such that the materials of optical ring resonator 205 can react with the reactive gas through capping layer 340. The reactive gas can include, but is not limited to, oxygen.

Again presuming such heating in the presence of the reactive gas leads to predictable shifts in a resonance of optical ring resonator 205, such a change can also be correlated with shifts in a resonance of optical ring resonator 205. Hence, in these implementations, the predetermined electric parameters of heater 206 can be further correlated with inducing shifts in the resonance of optical ring resonator 205 as a result of exposing at least optical ring resonator 205 to a reactive gas during heating.

In some of these implementations, heating of optical ring resonator 205 in the presence of a reactive gas, to shift a resonance of optical ring resonator 205 can be performed without introducing non-uniform dopant profiles in heater 206. Hence, in these implementations, predetermined electric parameters 225 of heater 206 can be correlated with inducing shifts in the resonance of optical ring resonator 205 as a result of exposing at least optical ring resonator 205 to a reactive gas during heating, without the use of non-uniform doping profiles.

Hence, predetermined electric parameters 225 can be correlated with inducing shifts in the resonance of optical ring resonator as a result of one or more of: migration of dopants due to heating by a heater having a non-uniform doping profile; changing one or more of a concentration and physical properties of lattice defects within the optical ring resonator during heating; exposing at least optical ring resonator to a reactive gas during heating.

Disclosed herein are various techniques for performing trimming of an optical ring resonator without the use of physically changing a geometry of the optical ring resonator by the removal/addition of material from the optical ring resonators using thin film deposition, etching, or laser ablation. Rather, a heater in an optical slab is used to heat a ring resonator to change its optical properties. For example, the heater can be doped non-uniformly and heated to temperatures where the dopant diffuses relative to the optical ring resonator, thereby inducing a shift in the resonance of the optical ring resonator as a result of changing a concentration of the dopant within the optical ring resonator. As such shifts are predictable, using a given non-uniform dopant profile, and can be performed without damaging the optical ring resonator, the dopant based heater can be used to trim the resonance frequency of the optical ring resonator. Present implementations can be particular useful with optical telecommunication device that includes two or more optical ring resonators, and which are commensurate with frequencies being emitted from an integrated light source and/or a dedicated light source.

Those skilled in the art will appreciate that in some implementations, the functionality of device 200 can be implemented using pre-programmed hardware or firmware elements (e.g., application specific integrated circuits (ASICs), electrically erasable programmable read-only memories (EEPROMs), etc.), or other related components. In other implementations, the functionality of device 200 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., radio-frequency (RF), microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   a substrate comprising a semiconductor on insulator structure;
   an optical slab on the insulator, the optical slab formed from the semiconductor;
   an optical input, an optical output, at least one optical bus there between, and an optical ring resonator coupled to the at least one optical bus and extending from the optical slab;
   a heater in the optical slab and within at least a portion of the optical ring resonator, the heater extending between at least an inner diameter and an outer diameter of the optical ring resonator, the heater comprising a dopant having a non-uniform profile in the semiconductor;
   electrical connections to the heater;
   a memory storing predetermined electric parameters of the heater which, when applied to the heater, will cause the dopant in the heater to diffuse relative to the optical ring resonator, thereby inducing a shift in the resonance of the optical ring resonator as a result of changing a concentration of the dopant within the optical ring resonator, the predetermined electric parameters stored as a function of resonance frequency shift in the optical ring resonator during heating; and,
   a controller in communication with the heater using the electrical connections, the controller configured to:
      determine an initial resonance frequency of the optical ring resonator;
      determine a subset of the predetermined electric parameters at which to operate the heater based on the initial resonance frequency and a target resonance frequency; and
      apply the subset of the predetermined electric parameters to the heater using the electrical connections to shift a resonance frequency of the optical ring resonator from the initial resonance frequency to the target resonance frequency.

2. The device of claim 1, wherein the non-uniform profile of the dopant comprises at least one peak on either side of the inner diameter and the outer diameter of the optical ring resonator.

3. The device of claim 1, wherein the non-uniform profile of the dopant comprises at least one peak between the inner diameter and the outer diameter of the optical ring resonator.

4. The device of claim 1, further comprising a second dopant in the heater, and the predetermined electric parameters of the heater are further correlated with inducing shifts in the resonance of the optical ring resonator as a result of changing a concentration of the second dopant within the optical ring resonator during heating.

5. The device of claim 1, wherein the predetermined electric parameters of the heater are further correlated with inducing shifts in the resonance of the optical ring resonator as a result of changing one or more of concentration and physical properties of lattice defects within the optical ring resonator during heating.

6. The device of claim 1, wherein the predetermined electric parameters of the heater are further correlated with inducing shifts in the resonance of the optical ring resonator as a result of exposing at least the optical ring resonator to a reactive gas during heating.

7. The device of claim 1, wherein the dopant comprises a p-type dopant.

8. The device of claim 1, wherein the dopant comprises an n-type dopant.

9. The device of claim 1, wherein the dopant comprises a deep-level dopant.

10. The device of claim 1, wherein the optical ring resonator comprises an optical filter and the heater extends around a substantial portion of the optical filter.

11. The device of claim 1, wherein the optical ring resonator comprises an optical modulator, the device further comprising a voltage control device around a first portion of the optical modulator, and the heater around a second portion of the optical modulator, the first portion longer than the second portion.

12. The device of claim 1, wherein a ratio of respective thicknesses of the optical ring resonator and the optical slab is greater than or equal to about 2-to-1.

13. The device of claim 1, further comprising an optical input, on the optical bus, the optical input configured to receive an optical signal which conveys the optical signal to the optical ring resonator.

14. The device of claim 1, further comprising a light source configured to provide an optical signal to the optical bus, which conveys the optical signal to the optical ring resonator.

15. The device of claim 1, further comprising a capping layer on the optical ring resonator and the optical bus.

16. A method comprising:
at a device comprising: a substrate comprising a semiconductor on insulator structure; an optical slab on the insulator, the optical slab formed from the semiconductor; an optical input, an optical output, at least one optical bus there between, and an optical ring resonator coupled to the at least one optical bus and extending from the optical slab; a heater in the optical slab and within at least a portion of the optical ring resonator, the heater extending between at least an inner diameter and an outer diameter of the optical ring resonator, the heater comprising a dopant having a non-uniform profile in the semiconductor; electrical connections to the heater; a memory storing predetermined electric parameters of the heater which, when applied to the heater, will cause the dopant in the heater to diffuse relative to the optical ring resonator, thereby inducing a shift in the resonance of the optical ring resonator as a result of changing a concentration of the dopant within the optical ring resonator, the predetermined electric parameters stored as a function of resonance frequency shift in the optical ring resonator during heating; and, a controller in communication with the heater using the electrical connections, determining, at the controller, an initial resonance frequency of the optical ring resonator;

determining, at the controller, a subset of the predetermined electric parameters at which to operate the heater based on the initial resonance frequency and a target resonance frequency; and applying, using the controller, the subset of the predetermined electric parameters to the heater using the electrical connections to shift a resonance frequency of the optical ring resonator from the initial resonance frequency to the target resonance frequency.

17. A non-transitory computer-readable medium storing a computer program, wherein execution of the computer program is for:
at a device comprising: a substrate comprising a semiconductor on insulator structure; an optical slab on the insulator, the optical slab formed from the semiconductor; an optical input, an optical output, at least one optical bus there between, and an optical ring resonator coupled to the at least one optical bus and extending from the optical slab; a heater in the optical slab and within at least a portion of the optical ring resonator, the heater extending between at least an inner diameter and an outer diameter of the optical ring resonator, the heater comprising a dopant having a non-uniform profile in the semiconductor; electrical connections to the heater; a memory storing predetermined electric parameters of the heater which, when applied to the heater, will cause the dopant in the heater to diffuse relative to the optical ring resonator, thereby inducing a shift in the resonance of the optical ring resonator as a result of changing a concentration of the dopant within the optical ring resonator, the predetermined electric parameters stored as a function of resonance frequency shift in the optical ring resonator during heating; and, a controller in communication with the heater using the electrical connections, determining, at the controller, an initial resonance frequency of the optical ring resonator;

determining, at the controller, a subset of the predetermined electric parameters at which to operate the heater based on the initial resonance frequency and a target resonance frequency; and applying, using the controller, the subset of the predetermined electric parameters to the heater using the electrical connections to shift a resonance frequency of the optical ring resonator from the initial resonance frequency to the target resonance frequency.

* * * * *